(12) United States Patent
Lim et al.

(10) Patent No.: US 12,120,464 B2
(45) Date of Patent: Oct. 15, 2024

(54) VIDEO SECURITY SYSTEM WITH IMPROVED NETWORK RESPONSE TIME USING PRE-AUTHENTICATION INFORMATION

(71) Applicant: IDIS CO., LTD., Daejeon-si (KR)

(72) Inventors: In Taek Lim, Goyang-si (KR); Sang Hoon Lee, Seoul (KR)

(73) Assignee: IDIS CO., LTD., Daejeon-si (KR)

( * ) Notice: Subject to any disclaimer, the term of this patent is extended or adjusted under 35 U.S.C. 154(b) by 255 days.

(21) Appl. No.: 17/838,223

(22) Filed: Jun. 12, 2022

(65) Prior Publication Data
US 2023/0011133 A1   Jan. 12, 2023

(30) Foreign Application Priority Data
Jul. 12, 2021 (KR) .................. 10-2021-0090931

(51) Int. Cl.
*H04N 7/18* (2006.01)
*G06F 21/31* (2013.01)
*G06F 21/60* (2013.01)
*G06F 21/86* (2013.01)

(52) U.S. Cl.
CPC ............ *H04N 7/181* (2013.01); *G06F 21/31* (2013.01); *G06F 21/602* (2013.01); *G06F 21/606* (2013.01); *G06F 21/86* (2013.01)

(58) Field of Classification Search
CPC .... H04N 7/181; H04N 7/18; H04N 21/25816; H04N 21/63345; G06F 21/31; G06F 21/602; G06F 21/606; G06F 21/86; H04L 9/0825; H04L 9/3226; H04L 63/0442; H04L 63/08; H04L 63/061; H04L 9/088; H04L 9/0894; H04L 9/30; H04L 47/283; H04L 63/0853

See application file for complete search history.

(56) References Cited

U.S. PATENT DOCUMENTS

| | | | |
|---|---|---|---|
| 2005/0278259 A1* | 12/2005 | Gunaseelan | G06Q 10/10 705/59 |
| 2007/0185815 A1 | 8/2007 | Boccon-Gibod et al. | |
| 2011/0010547 A1 | 1/2011 | Noda | |

(Continued)

FOREIGN PATENT DOCUMENTS

| | | |
|---|---|---|
| CN | 110662091 A | 1/2020 |
| KR | 10-1481402 B1 | 1/2015 |

(Continued)

OTHER PUBLICATIONS

Non-final Office Action mailed Dec. 16, 2022 for Korean Application No. 10-2021-0090931.

(Continued)

*Primary Examiner* — Baotran N To
(74) *Attorney, Agent, or Firm* — Insight Law Group, PLLC; Seung Lee

(57) ABSTRACT

A video security system with improved network response speed using pre-authentication information, which is capable of improving a network response speed by simplifying handshaking for securely exchanging authentication information and an encryption key in a process of starting communication between a client terminal and a server using pre-authentication information that is valid only for the client terminal, is provided.

20 Claims, 4 Drawing Sheets

(56) References Cited

U.S. PATENT DOCUMENTS

2018/0083938 A1    3/2018  Kim et al.
2020/0273586 A1    8/2020  Lee et al.
2021/0211503 A1*   7/2021  Redgate ................ H04L 67/125

FOREIGN PATENT DOCUMENTS

KR    10-2016-0131744 A    11/2016
KR    10-2017-0013141 A     2/2017
KR    10-2020-0104219 A     9/2020

OTHER PUBLICATIONS

Extended European Search Report mailed Jan. 2, 2023 for European Application No. 22182337.0.

* cited by examiner

VIDEO SECURITY SYSTEM WITH IMPROVED NETWORK RESPONSE TIME USING PRE-AUTHENTICATION INFORMATION

CROSS-REFERENCE TO RELATED APPLICATION(S)

This application claims priority from Korean Patent Application No. 10-2021-0090931, filed on Jul. 12, 2021, in the Korean Intellectual Property Office, the disclosure of which is incorporated herein by reference in its entirety.

BACKGROUND

1. Field

The following description relates to a video security technology, and more specifically, to a video security system with improved network response speed using pre-authentication information.

2. Description of Related Art

Video security systems handle sensitive information and thus require high security. For high security, there is a technology of enabling a client and a server (an image storage and monitoring device) to trust each other, and encrypting data transmitted and received between the client and the server so that the data cannot be intercepted from the outside.

In addition, there is a demand for a method of a client verifying whether the client is connected to a normal device by not only allowing the device to authenticate the client but also allowing the client to authenticate the device.

In communication requiring authentication and security, an initiation of communication between a client and a server requires a process of securely exchanging authentication information and an encryption key between the client and the server, which is referred to as handshaking.

The time for handshaking that performs information transmission and reception between the client and server is referred to as a response delay time (Round Trip Time, RTT), and a session, which is a communication channel between a client and a server, is formed in a video security system after the RTT required for handshaking elapses.

The client transmits system control commands required for real-time video monitoring, recorded video playback, device setting, and the like to the server through the session, and the server executes the system control commands transmitted from the client through the session to process the real-time video monitoring, the recorded video playback, the device setting, and the like.

FIG. 1 is a diagram illustrating an example of a conventional handshaking process between a client terminal and a video security system of a server. Referring to FIG. 1, the client terminal transmits a session start request including a client terminal public key to the video security system of the server. Then, the video security system transmits a session start response including a video security system public key and a random character string to the client terminal to establish a session.

When the session is established between the client terminal and the video security system of the server, the client terminal transmits a login request including a user ID and an encryption value obtained by encrypting a password and the random character string with the video security system public key to the video security system.

Then, the video security system processes the video security system login for the client terminal using the user ID and the password, which is obtained by decrypting the encryption value with a video security system private key, and transmits a login response to the client terminal to notify whether the login is successful (a result of the login request).

When the client terminal is logged in to the video security system, the client terminal transmits a system control command to the video security system, and the video security system receiving the system control command processes the system control command and then transmits a system control command response to the client terminal to notify a result of processing the system control command.

As such, in the conventional handshaking process between the client terminal and the video security system of the server, a total of three RTTs including two RTTs for security authentication and one RTT for transmitting a system control command after completion of security authentication occur.

However, in the process of starting communication between the client and the server for communication requiring authentication and security, the more complex the handshaking process of securely exchanging authentication information and encryption key, the slower the network response speed of the server (the video security system) may be.

RELATED ART DOCUMENTS

Patent Document

Korean Registered Patent No. 10-1481402 (Jan. 6, 2015)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a video security system with improved network response speed using pre-authentication information that is capable of improving a network response speed by simplifying handshaking for securely exchanging authentication information and an encryption key in a process of starting communication between a client terminal and a server using pre-authentication information that is valid only for the client terminal.

In one general aspect, there is a video security system with improved network response speed using pre-authentication information, the video security system including: a pre-authentication information issuing unit configured to generate pre-authentication information that is valid only for a client terminal and issue the generated pre-authentication information to the client terminal; a pre-authentication information caching unit configured to cache the pre-authentication information issued by the pre-authentication information issuing unit in a cache memory; a login request receiving unit configured to receive a login request including a user identification (ID), a client terminal public key, a pre-authentication information encryption value obtained by encrypting the pre-authentication information and a random character string with a video image security system public key, and a system control command from the client terminal; a user authorization performing unit configured to perform user authorization on the user ID received by the login request receiving unit; a pre-authentication information authentication unit configured to decrypt the pre-authentication information encryption value received by the login request receiving unit with the video security system public key to obtain the pre-authentication information, determine whether the obtained pre-authentication information is cached in the cache memory, and authenticate the pre-authentication information; and a control unit configured to control overall operations of the system and, upon succeeding in the user authorization by the user authorization performing unit and succeeding in the pre-authentication information authentication by the pre-authentication information authentication unit, process the system control command received by the login request receiving unit.

The control unit may be configured to, in response to a pre-authentication information reissuance request from the client terminal due to failing in the pre-authentication information authentication by the pre-authentication information authentication unit, control the pre-authentication information issuing unit to generate new pre-authentication information and reissue the generated new pre-authentication information to the client terminal.

The pre-authentication information caching unit may be configured to newly cache the pre-authentication information reissued by the pre-authentication information issuing unit in the cache memory.

The pre-authentication information issuing unit may be configured to encrypt the pre-authentication information with the client terminal public key and issue the encrypted pre-authentication information to the client terminal.

The system control command may include a real-time video monitoring command or a recorded video playback command.

The video security system may further include a login response transmission unit configured to transmit a login response to the client terminal according to a result of the user authorization by the user authorization performing unit and a result of the pre-authentication information authentication by the pre-authentication information authentication unit.

The pre-authentication information issuing unit may be configured to, when issuing the pre-authentication information and transmitting the issued pre-authentication information to the client terminal, transmit system-unique identification information together with the issued pre-authentication information such that the client terminal checks for forgery or tampering of video security system when the client terminal accesses the video security system later.

Other features and aspects will be apparent from the following detailed description, the drawings, and the claims.

Figure 1:
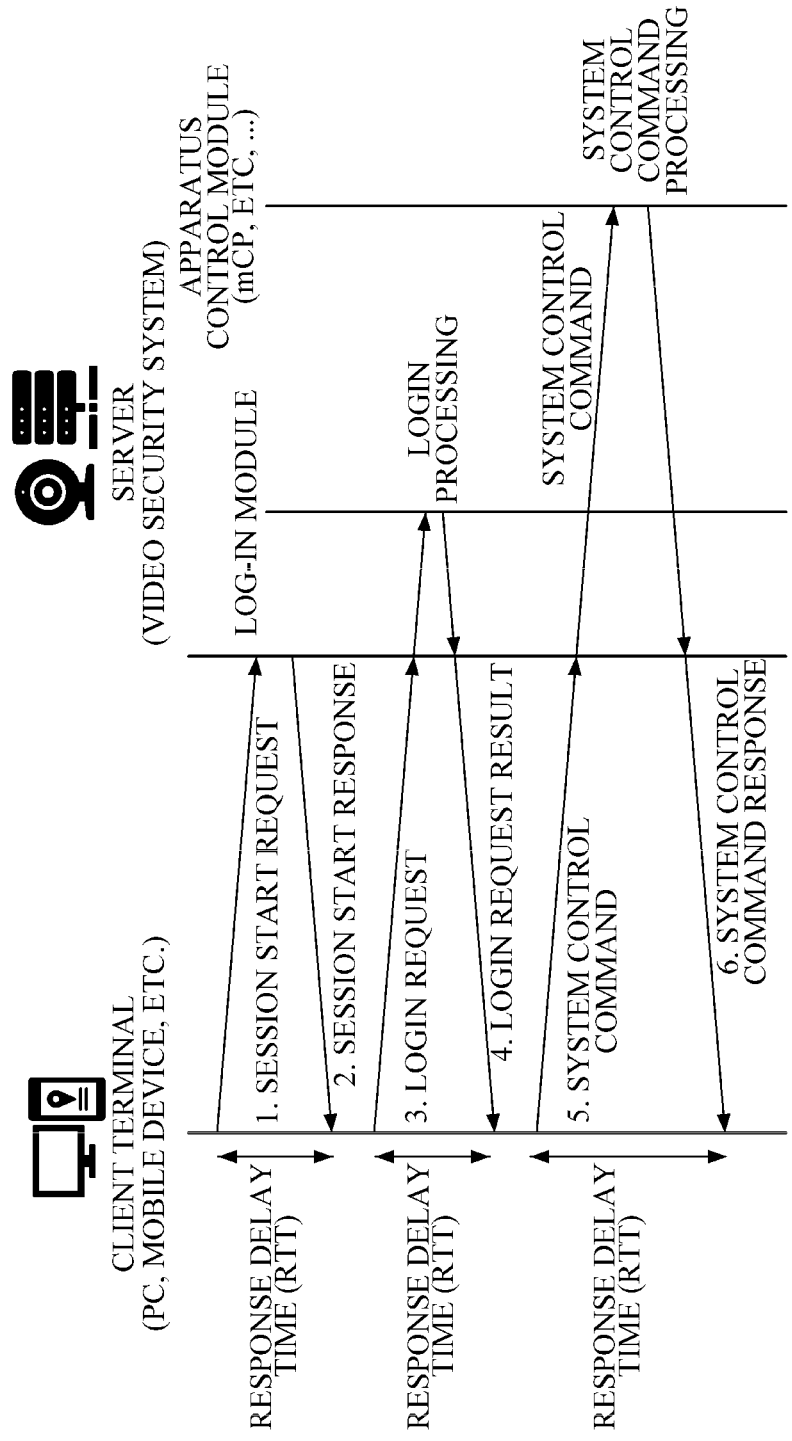
FIG. 1 is a diagram illustrating an example of a conventional handshaking process between a client terminal and a video security system of a server.

Throughout the accompanying drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present invention will be described in detail so that those skilled in the art can easily understand and reproduce the present invention through exemplary embodiments described with reference to the accompanying drawings. Specific embodiments are shown by way of example in the specification and the drawings and but are not intended to limit the scope and spirit of the present invention.

In the description of the present invention, the detailed description of related known functions or configurations will be omitted to avoid obscuring the subject matter of the present invention.

It should be understood that when an element is referred to as being "connected" or "coupled" to another element, the element can be directly connected or coupled to another element or intervening elements may be present.

Conversely, when an element is referred to as being "directly connected" or "directly coupled" to another element, there are no intervening elements present.

Figure 2:
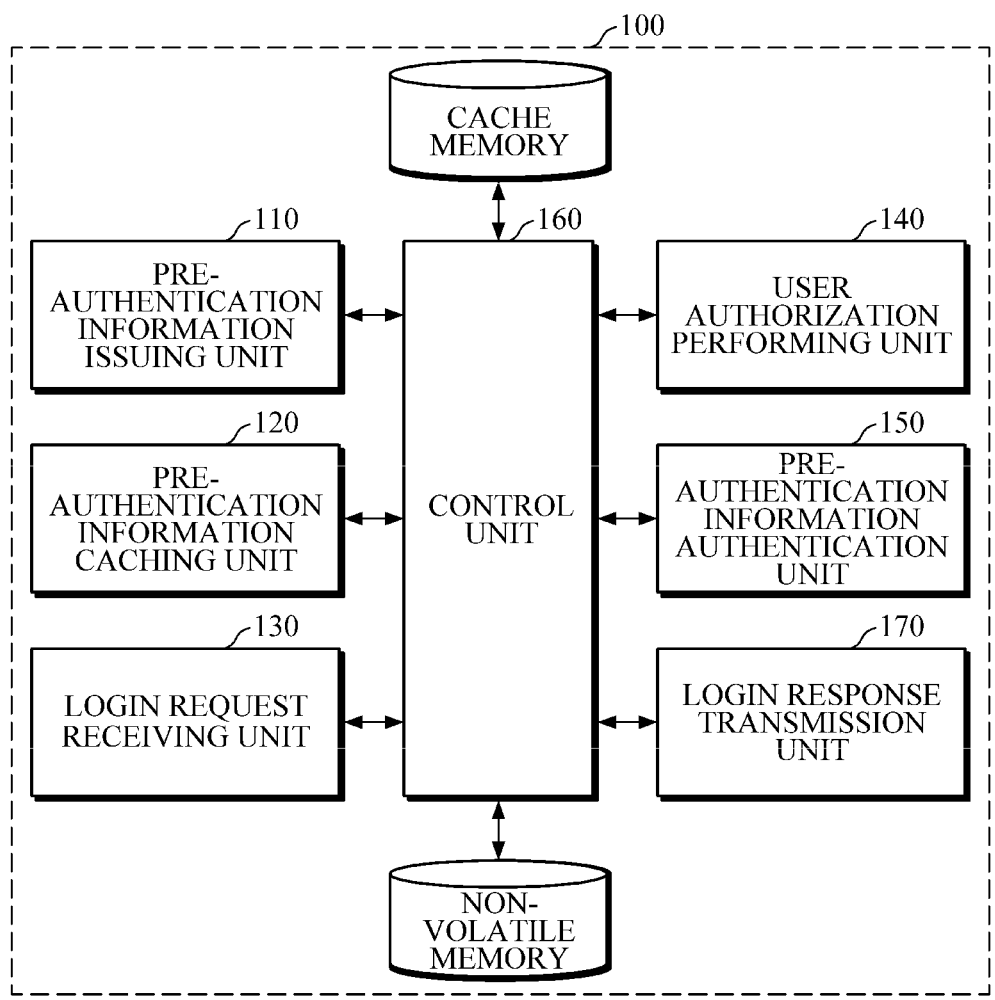
FIG. 2 is a block diagram illustrating a configuration of a video security system with improved network response speed using pre-authentication information according to an embodiment of the present invention.

FIG. 2 is a block diagram illustrating a configuration of a video security system 100 with improved network response speed using pre-authentication information according to an embodiment of the present invention. The video security system 100 with improved network response speed using pre-authentication information according to the present invention may be implemented in the form of software executed on a server.

Referring to FIG. 2, the video security system 100 with improved network response speed using pre-authentication information according to the present embodiment includes a pre-authentication information issuing unit 110, a pre-authentication information caching unit 120, a login request receiving unit 130, a user authorization performing unit 140, a pre-authentication information authentication unit 150, and a control unit 160.

The pre-authentication information issuing unit 110 generates pre-authentication information that is valid only for a client terminal 200 and issues the generated pre-authentication information to the client terminal 200. In this case, the pre-authentication information issuing unit 110 may be implemented to encrypt the pre-authentication information with a client terminal public key and issue the encrypted pre-authentication information to the client terminal 200.

Meanwhile, the pre-authentication information is unique authentication information that is issued in a state in which typical handshaking between a client terminal and a video security system of a server shown in FIG. 1 is achieved and then used in a future access process, and the pre-authentication information may be in the form of a pre-authentication key that is an array of specific characters and numbers.

In this case, the pre-authentication information issuing unit 110 may be implemented to, when issuing the pre-authentication information and transmitting the issued pre-authentication information to the client terminal 200, transmit system-unique identification information together with the issued pre-authentication information such that the client terminal 200 checks for forgery or tampering of the video security system 100 when the client terminal 200 accesses the video security system 100 later. Meanwhile, the system-unique identification information may be encrypted with the client terminal public key and transmitted.

Accordingly, the client terminal 200, when logged in to the video security system 100 with improved network response speed, compares system unique identification information transmitted, as a result of the log-in, by the video security system 100 with improved network response speed with the previously stored system unique identification information to determine whether the target video security system to be accessed by the client terminal 200 is the same as the video security system to which the client terminal 200 has been previously logged in, and when the target video security system is not the same as the previously logged in video security system, terminates the session.

The pre-authentication information caching unit 120 caches the pre-authentication information issued by the pre-authentication information issuing unit 110 in a cache memory. For example, the pre-authentication information caching unit 120 may be implemented to cache a record including, as components, a user identification (ID), pre-authentication information, and a random character string (Salt) in byte units added when a digest is generated by a one-way hash function in a cache memory, which is a volatile memory, and manage the record.

In this case, the pre-authentication information caching unit 120 may maintain up to N records including user IDs, pre-authentication information, and random character strings in the cache memory in a 1:N:N relationship, and when new pre-authentication information is issued in a state in which N records are cached in the cache memory, the pre-authentication information caching unit 120 deletes the oldest record from the cache memory, and adds a record including the newly issued pre-authentication information to the cache memory.

On the other hand, the records cached in the cache memory may be all deleted from the cache memory when the video security system 100 is restarted, and as needed, some or all of the records cached in the cache memory may be deleted from the cache memory by an administrator, and when a user ID is deleted or a password is changed, records related to the user ID may be deleted from the cache memory.

The login request receiving unit 130 receives a login request including a user ID, a client terminal public key, a pre-authentication information encryption value obtained by encrypting pre-authentication information and a random character string with a video security system public key, and a system control command from the client terminal 200.

Figure 3:
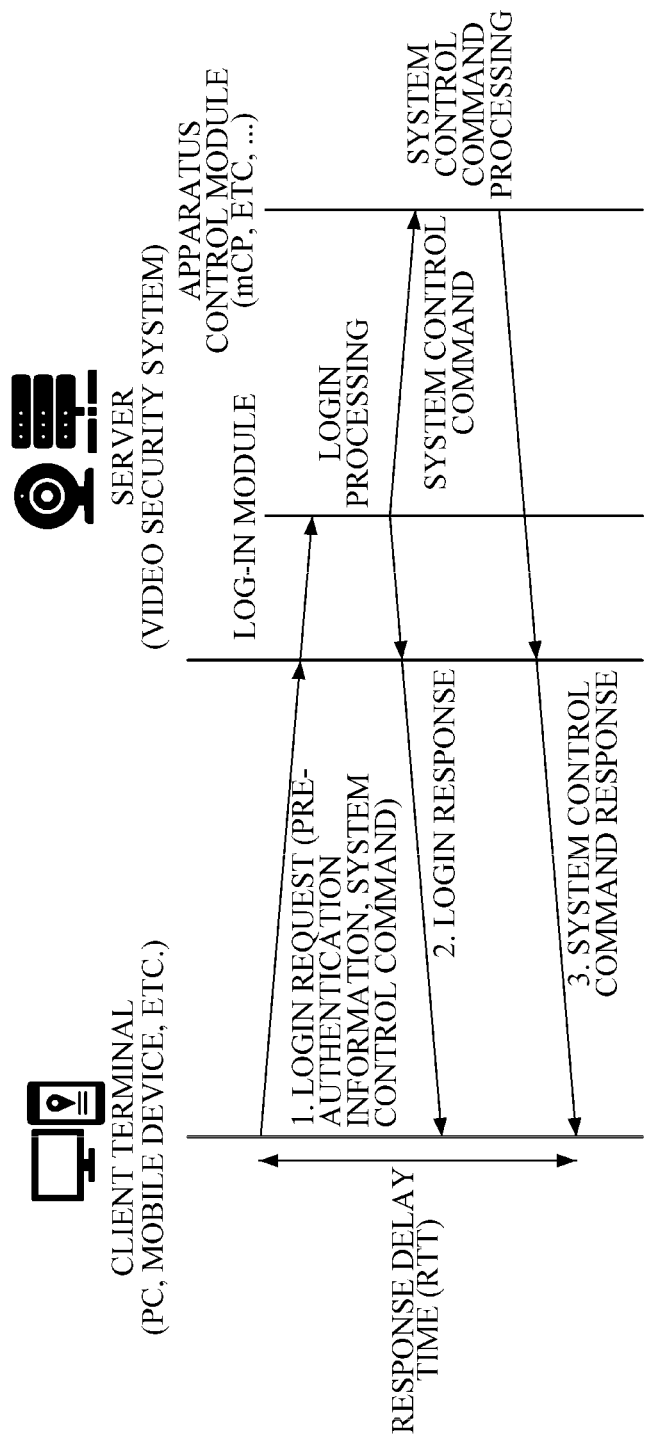
FIG. 3 is a diagram illustrating an example of a handshaking process when valid pre-authentication information is used in a video security system with improved network response speed using pre-authentication information according to the present invention.

FIG. 3 is a diagram illustrating an example of a handshaking process when valid pre-authentication information is used in a video security system with improved network response speed using pre-authentication information according to the present invention.

Referring to FIG. 3, the client terminal 200 having received pre-authentication information issued by the pre-authentication information issuing unit 110 transmits a login request including a user ID, a client terminal public key, a pre-authentication information encryption value obtained by encrypting the pre-authentication information and a random character string with a video security system public key, and a system control command.

Then, the video security system 100 with improved network response speed using the pre-authentication information according to the present invention receives the login request including the user ID, the client terminal public key, the pre-authentication information encryption value obtained by encrypting the pre-authentication information and the random character string with the video security system public key, and the system control command through the login request receiving unit 130.

The user authorization performing unit 140 performs user authorization on the user ID received by the login request receiving unit 130. For example, the user authorization performing unit 140 may determine whether the user authorization succeeds or fails according to whether the same user ID as the user ID received by the login request receiving unit 130 is registered in a non-volatile memory (not shown), such as an electrically erasable programmable ROM (EEPROM), a flash memory, and the like.

The pre-authentication information authentication unit 150 decrypts the pre-authentication information encryption value received by the login request receiving unit 130 with a video security system private key to obtain the pre-authentication information, determines whether the obtained pre-authentication information is cached in the cache memory, and authenticates the pre-authentication information. The pre-authentication information authentication unit 150 may determine whether the pre-authentication information authentication succeeds or fails according to whether the same pre-authentication information as the obtained pre-authentication information is cached in the cache memory.

The control unit 160, upon succeeding in the user authorization by the user authorization performing unit 140 and succeeding in the pre-authentication information authentication by the pre-authentication information authentication unit 150, processes the system control command received by the login request receiving unit 130. In this case, the system control command may include a real-time video monitoring command or a recorded video playback command.

However, the present invention is not limited thereto, the system control command may include a command related to system settings, such as a system name setting, a network setting, an event detection setting, etc. or a command related to recording settings, such as a memory format, a recording capacity limit, a recording setting change, etc. or a command related to video control, such as pan-tilt-zoom (PTZ) control, a color (saturation, brightness) setting, etc. or a command related to external system interworking.

Referring to FIG. 3, it can be seen that, upon succeeding in the user authorization by the user authorization performing unit 140 and succeeding in the pre-authentication information authentication by the pre-authentication information authentication unit 150, the control unit 160 processes the system control command received by the login request receiving unit 130. A comparison of FIGS. 1 and 3 shows that a round trip time (RTT) according to the present invention using pre-authentication information is significantly reduced compared to the related art.

As described above, the present invention is implemented such that the video security system 100 with improved network response speed using pre-authentication information issues pre-authentication information, which is a separate key valid only for a user of the client terminal 200, to the client terminal 200, caches the pre-authentication information, and then uses the pre-authentication information in a future access process.

The present invention is implemented to, when the client terminal 200 accesses the video security system 100 with improved network response speed using pre-authentication information, omit a process of exchanging a public key in a handshaking process using a user ID, a random character string, and pre-authentication information, thereby resulting in faster network response.

In addition, as a system control command required for control of the video security system with improved network response speed using pre-authentication information is transmitted together with the pre-authentication information, a desired system control operation is performed.

In this process, since the pre-authentication information is encrypted with the public key of the counterpart (the client terminal and the video security system), and delivered and is used together with the user ID and the random character string, the pre-authentication information may neither be stolen by a third party nor be subject to a dictionary attack. Whenever both the client terminal and the video security system are newly started, a private key-public key pair is newly generated, or even in operation, a key pair may be generated as needed.

When the client terminal 200 is successfully logged in to the video security system 100 with improved network response speed, the video security system 100 with improved network response speed provides the client terminal 200 with the pre-authentication information, which is unique to the client terminal 200, such that the client terminal 200 keeps the pre-authentication information stored.

According to the implementation as described above, the present invention may improve the network response speed by simplifying handshaking for securely exchanging authentication information and an encryption key in a process of starting communication between a client terminal and a server using pre-authentication information that is valid only for the client terminal, so that the client terminal may rapidly access the video security system and transmit a system control command.

Meanwhile, according to an additional aspect of the present invention, the video security system 100 with improved network response speed using pre-authentication information may further include a login response transmission unit 170. The login response transmission unit 170 transmits a login response to the client terminal 200 according to a result of the user authorization by the user authorization performing unit 140 and a result of the pre-authentication information authentication by the pre-authentication information authentication unit 150.

For example, upon succeeding in the user authorization by the user authorization performing unit 140 and succeeding in the pre-authentication information authentication by the pre-authentication information authentication unit 150, the control unit 160 may process a system control command and the login response transmission unit 170 may transmit a login response notifying login success, and upon failing in the pre-authentication information authentication by the pre-authentication information authentication unit 150, the login response transmission unit 170 transmits a login response notifying login failure.

Referring to FIG. 3, it can be seen that, upon succeeding in the user authorization by the user authorization performing unit 140 and succeeding in the pre-authentication information authentication by the pre-authentication information authentication unit 150, the control unit 160 processes a system control command and then the login response transmission unit 170 transmits a login response notifying login success to the client terminal 200.

Meanwhile, according to an additional aspect of the invention, the control unit 160 may, in response to a pre-authentication information reissuance request from the client terminal 200 due to failing in the pre-authentication information authentication by the pre-authentication information authentication unit 150, control the pre-authentication information issuing unit 110 to generate new pre-authentication information and reissue the generated new pre-authentication information to the client terminal 200. In this case, the pre-authentication information caching unit 120 newly caches the pre-authentication information reissued by the pre-authentication information issuing unit 110 in the cache memory.

Additionally, the pre-authentication information issuing unit 110 may be implemented to, when re-issuing new pre-authentication information and transmitting the re-issued pre-authentication information to the client terminal 200, transmit system-unique identification information together with the re-issued pre-authentication information such that the client terminal 200 checks for forgery or tampering of the video security system 100 when the client terminal 200 accesses the video security system 100 later.

Even in a state in which the client terminal 200 is issued pre-authentication information, when the pre-authentication information is not present in the cache memory of the video security system 100 with improved network response speed using pre-authentication information, the pre-authentication information is invalid. When the client terminal 200 uses the same random character string as the previous random character string, the use of the same random character string is determined as a replay attack and the pre-authentication information authentication is rejected. As such, when the pre-authentication information authentication fails even by using the pre-authentication information, a process of re-issuing pre-authentication information is performed.

Figure 4:
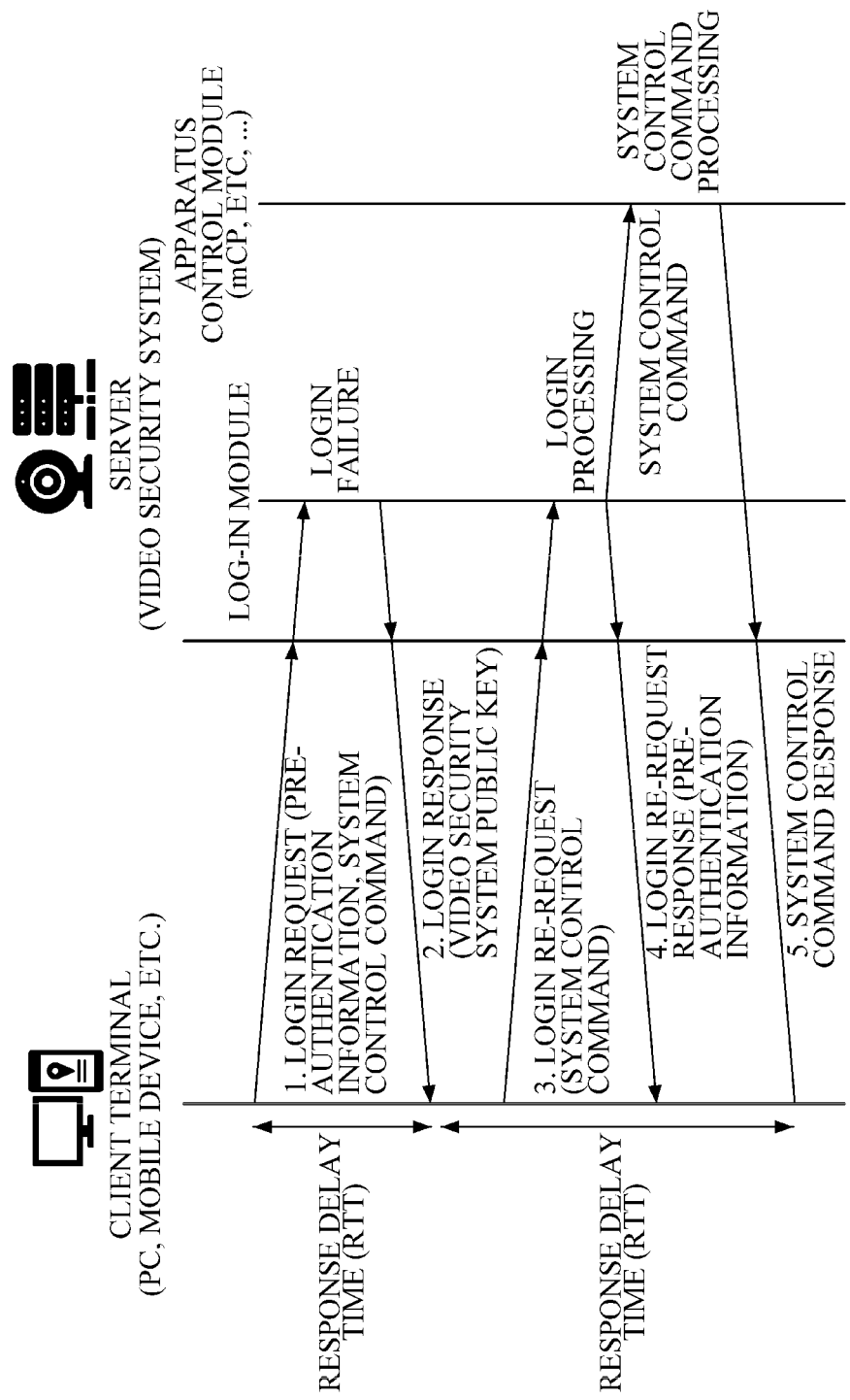
FIG. 4 is a diagram illustrating an example of a handshaking process when invalid pre-authentication information is used in a video security system with improved network response speed using pre-authentication information according to the present invention.

FIG. 4 is a diagram illustrating an example of a handshaking process when invalid pre-authentication information is used in a video security system with improved network response speed using pre-authentication information according to the present invention.

Upon succeeding in the user authorization by the user authorization performing unit 140 but failing in the pre-authentication information authentication by the pre-authentication information authentication unit 150, the login response transmission unit 170 transmits a login response notifying pre-authentication information authentication failure together with a video security system public key and a random character string to the client terminal 200.

The client terminal 200, upon receiving the login response, transmits a login re-request including a user ID, an encryption value obtained by encrypting a password and the random character string with the video security system public key, and a system control command to the video security system 100.

The video security system 100 receives the login re-request through the login request receiving unit 130, and allows the user authorization performing unit 140 to perform authorization on the user ID and the password, which is obtained by decrypting the encryption value with the video security system public key, and upon succeeding in the user authorization, the control unit 160 generates new pre-authentication information through the pre-authentication information issuing unit 110.

Then, the video security system 100 encrypts the new pre-authentication information with a client terminal public key and transmits a login re-request response including the encrypted pre-authentication information to the client terminal 200 through the login response transmission unit 170. Meanwhile, aside from reissuing the pre-authentication information, the control unit 160 may process the system control command included in the login re-request upon succeeding in the user authorization.

Upon receiving the login re-request response including the encrypted pre-authentication information from the video security system 100, the client terminal 200 decrypts the encrypted pre-authentication information with a client terminal private key to obtain the pre-authentication information, and upon future access, rapidly accesses the video security system 100 using the pre-authentication information and transmit a system control command.

According to the implementation as described above, the present invention may improve the network response speed by simplifying handshaking for securely exchanging authentication information and an encryption key in a process of starting communication between a client terminal and a server using pre-authentication information that is valid only for the client terminal, so that the client terminal may rapidly access the video security system and transmit a system control command.

As is apparent from the above, the present invention can improve the network response speed by simplifying handshaking for securely exchanging authentication information and an encryption key in a process of starting communication between a client terminal and a server using pre-authentication information that is valid only for the client terminal, and thus the client terminal can rapidly access the video security system and transmit a system control command.

While the invention has been shown and described with respect to specific embodiments, the embodiments are used to aid in the understanding of the present invention rather than limiting the present invention.

Therefore, the spirit of the present invention is not defined by the above embodiments but by the appended claims of the present invention, and the scope of the present invention is to cover not only the following claims but also all modifications and equivalents derived from the claims.

INDUSTRIAL APPLICABILITY

The present invention is applicable to a video security technology and an application technology thereof for industrial use.

What is claimed is:

1. A video security system with improved network response speed using pre-authentication information, the video security system comprising a plurality of memories, wherein the plurality of memories store instructions to implement:
    a pre-authentication information issuing operation to generate pre-authentication information that is valid only for a client terminal and issue the generated pre-authentication information to the client terminal;
    a pre-authentication information caching operation to cache the pre-authentication information issued by the pre-authentication information issuing operation in a cache memory among the plurality of memories;
    a login request receiving operation to receive a login request including a user identification (ID), a client terminal public key, a pre-authentication information encryption value obtained by encrypting the pre-authentication information and a random character string with a video image security system public key, and a system control command from the client terminal;
    a user authorization performing operation to perform user authorization on the user ID received by the login request receiving operation;
    a pre-authentication information authentication operation to decrypt the pre-authentication information encryption value received by the login request receiving operation with a video security system private key to obtain the pre-authentication information, determine whether the obtained pre-authentication information is cached in the cache memory, and authenticate the pre-authentication information; and
    a control operation to control overall operations of the video security system and, upon succeeding in the user authorization by the user authorization performing operation and succeeding in the pre-authentication information authentication by the pre-authentication information authentication operation, process the system control command received by the login request receiving operation.

2. The video security system of claim 1, wherein the control operation further performs:
    in response to a pre-authentication information reissuance request from the client terminal due to failing in the pre-authentication information authentication by the pre-authentication information authentication operation, controlling the pre-authentication information issuing operation to generate new pre-authentication information and reissuing the generated new pre-authentication information to the client terminal.

3. The video security system of claim 2, wherein the pre-authentication information caching operation further performs: newly caching the pre-authentication information reissued by the pre-authentication information issuing operation in the cache memory.

4. The video security system of claim 1, wherein the pre-authentication information issuing operation further performs: encrypting the pre-authentication information with the client terminal public key and issuing the encrypted pre-authentication information to the client terminal.

5. The video security system of claim 1, wherein the system control command includes a real-time video monitoring command or a recorded video playback command.

6. The video security system of claim 1, wherein the plurality of memories further comprises instructions to implement: a login response transmission operation to transmit a login response to the client terminal according to a result of the user authorization by the user authorization performing unit operation and a result of the pre-authentication information authentication by the pre-authentication information authentication operation.

7. The video security system of claim 2, wherein the pre-authentication information issuing operation further performs: when issuing the pre-authentication information and transmitting the issued pre-authentication information to the client terminal, transmitting system-unique identification information together with the issued pre-authentication information such that the client terminal checks for forgery or tampering of video security system when the client terminal accesses the video security system later.

8. A method, comprising:
    a pre-authentication information issuing operation to generate pre-authentication information that is valid only for a client terminal and issue the generated pre-authentication information to the client terminal;

a pre-authentication information caching operation to cache the pre-authentication information issued by the pre-authentication information issuing operation in a cache memory;

a login request receiving operation to receive a login request including a user identification (ID), a client terminal public key, a pre-authentication information encryption value obtained by encrypting the pre-authentication information and a random character string with a video image security system public key, and a system control command from the client terminal;

a user authorization performing operation to perform user authorization on the user ID received by the login request receiving operation;

a pre-authentication information authentication operation to decrypt the pre-authentication information encryption value received by the login request receiving operation with a video security system private key to obtain the pre-authentication information, determine whether the obtained pre-authentication information is cached in the cache memory, and authenticate the pre-authentication information; and a control operation to control overall operations of the system and, upon succeeding in the user authorization by the user authorization performing operation and succeeding in the pre-authentication information authentication by the pre-authentication information authentication operation, process the system control command received by the login request receiving operation.

9. The method of claim 8, wherein the control operation further comprises:

in response to a pre-authentication information reissuance request from the client terminal due to failing in the pre-authentication information authentication by the pre-authentication information authentication operation, controlling the pre-authentication information issuing operation to generate new pre-authentication information and reissuing the generated new pre-authentication information to the client terminal.

10. The method of claim 9, wherein the pre-authentication information caching operation further comprises: newly caching the pre-authentication information reissued by the pre-authentication information issuing operation in the cache memory.

11. The method of claim 8, wherein the pre-authentication information issuing operation further comprises: encrypting the pre-authentication information with the client terminal public key and issuing the encrypted pre-authentication information to the client terminal.

12. The method of claim 8, wherein the system control command includes a real-time video monitoring command or a recorded video playback command.

13. The method of claim 8, further comprising:

a login response transmission operation to transmit a login response to the client terminal according to a result of the user authorization by the user authorization performing operation and a result of the pre-authentication information authentication by the pre-authentication information authentication operation.

14. The method of claim 9, wherein the pre-authentication information issuing operation further comprises: when issuing the pre-authentication information and transmitting the issued pre-authentication information to the client terminal, transmitting system-unique identification information together with the issued pre-authentication information such that the client terminal checks for forgery or tampering of video security system when the client terminal accesses the video security system later.

15. A system comprising:

a plurality of processors; and a plurality of memories, wherein the plurality of processors are configured, when executing program instructions stored in the memories, to perform:

a pre-authentication information issuing operation to generate pre-authentication information that is valid only for a client terminal and issue the generated pre-authentication information to the client terminal;

a pre-authentication information caching operation to cache the pre-authentication information issued by the pre-authentication information issuing operation in a cache memory among the plurality of memories;

a login request receiving operation to receive a login request including a user identification (ID), a client terminal public key, a pre-authentication information encryption value obtained by encrypting the pre-authentication information and a random character string with a video image security system public key, and a system control command from the client terminal;

a user authorization performing operation to perform user authorization on the user ID received by the login request receiving operation;

a pre-authentication information authentication operation to decrypt the pre-authentication information encryption value received by the login request receiving operation with a video security system private key to obtain the pre-authentication information, determine whether the obtained pre-authentication information is cached in the cache memory, and authenticate the pre-authentication information; and a control operation to control overall operations of the system and, upon succeeding in the user authorization by the user authorization performing operation and succeeding in the pre-authentication information authentication by the pre-authentication information authentication operation, process the system control command received by the login request receiving operation.

16. The system of claim 15, wherein the plurality of processors are further configured, in performing the control operation, to perform:

in response to a pre-authentication information reissuance request from the client terminal due to failing in the pre-authentication information authentication by the pre-authentication information authentication operation, controlling the pre-authentication information issuing operation to generate new pre-authentication information and reissuing the generated new pre-authentication information to the client terminal.

17. The system of claim 16, wherein the plurality of processors are further configured, in performing the pre-authentication information caching operation, to perform: newly caching the pre-authentication information reissued by the pre-authentication information issuing operation in the cache memory.

18. The system of claim 15, wherein the plurality of processors are further configured, in performing the pre-authentication information issuing operation, to perform: encrypting the pre-authentication information with the client terminal public key and issuing the encrypted pre-authentication information to the client terminal.

19. The system of claim 15, wherein the system control command includes a real-time video monitoring command or a recorded video playback command.

20. The system of claim 15, wherein the plurality of processors are further configured to perform:
- a login response transmission operation to transmit a login response to the client terminal according to a result of the user authorization by the user authorization performing operation and a result of the pre-authentication information authentication by the pre-authentication information authentication operation.

* * * * *